(12) United States Patent
Jang

(10) Patent No.: US 7,333,168 B2
(45) Date of Patent: Feb. 19, 2008

(54) LIQUID CRYSTAL DISPLAY APPARATUS

(75) Inventor: Young-Kyu Jang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/331,420

(22) Filed: Dec. 30, 2002

(65) Prior Publication Data

US 2003/0142251 A1 Jul. 31, 2003

(30) Foreign Application Priority Data

Jan. 25, 2002 (KR) ................................ 2002-4372

(51) Int. Cl.
*G02F 1/1333* (2006.01)
*G02F 1/1337* (2006.01)
(52) U.S. Cl. ...................... 349/110; 349/128
(58) Field of Classification Search ................ 349/128, 349/130, 136, 110; 345/52
See application file for complete search history.

(56) References Cited

U.S. PATENT DOCUMENTS

| 5,568,294 A | * | 10/1996 | Lee | 349/117 |
| 5,724,107 A | * | 3/1998 | Nishikawa et al. | 349/38 |
| 5,781,262 A | * | 7/1998 | Suzuki et al. | 349/128 |
| 5,790,219 A | * | 8/1998 | Yamagishi et al. | 349/106 |
| 6,011,604 A | * | 1/2000 | Miyazawa | 349/110 |
| 6,219,118 B1 | * | 4/2001 | Zhang | 349/110 |
| 6,417,900 B1 | * | 7/2002 | Shin et al. | 349/110 |
| 6,426,594 B1 | * | 7/2002 | Ito | 315/169.1 |
| 6,552,764 B2 | * | 4/2003 | Fujioka et al. | 349/106 |
| 2002/0044239 A1 | * | 4/2002 | Koyama | 349/110 |

FOREIGN PATENT DOCUMENTS

JP 06-273802 9/1994

OTHER PUBLICATIONS

Office Action issued by Korean Patent Office dated Mar. 22, 2007.

* cited by examiner

*Primary Examiner*—Michael H. Caley
(74) *Attorney, Agent, or Firm*—Cantor Colburn LLP

(57) ABSTRACT

In an LCD apparatus, a non-effective display region disposed between pixel electrodes and a declination line disposed on the pixel electrodes are covered by means of a light-leakage preventing layer, thereby preventing the light from being leaked through the non-effective display region and the declination line. Accordingly, it is possible to prevent the brightness of the light from being decreased and an image displayed through the LCD apparatus from being deteriorated in quality.

26 Claims, 20 Drawing Sheets

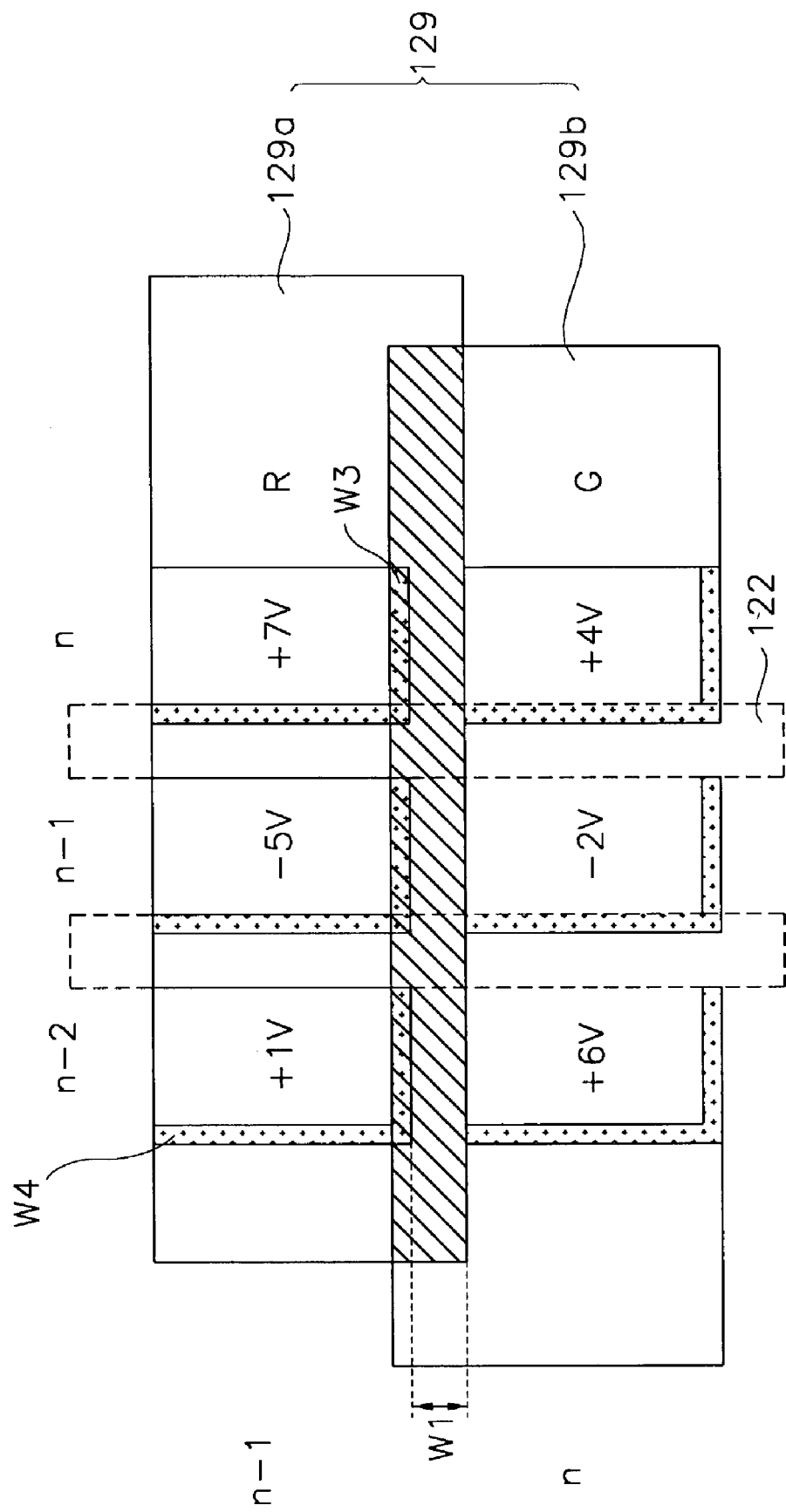

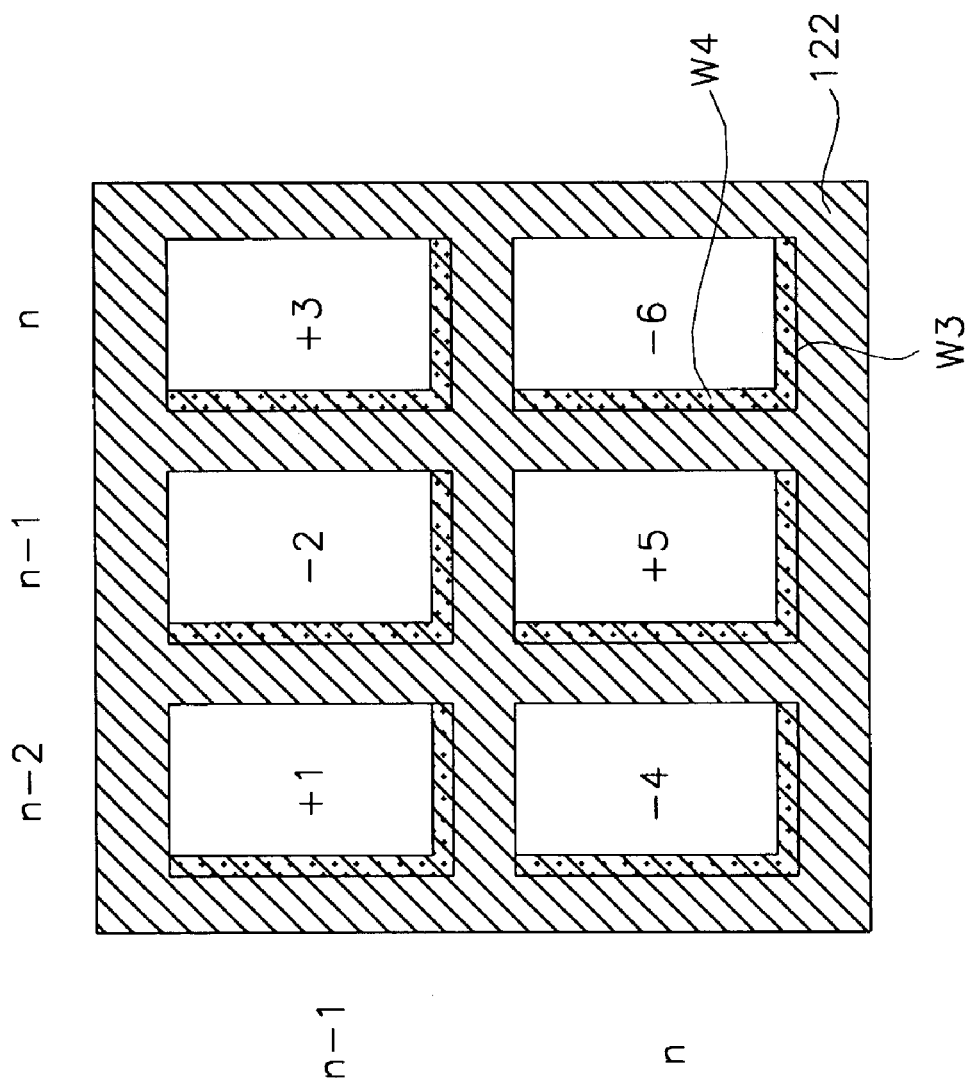

LIQUID CRYSTAL DISPLAY APPARATUS

BACKGROUND OF THE INVENTION

1. Field of the Invention

The present invention relates to a liquid crystal display (LCD) apparatus, and more particularly to an LCD apparatus capable of displaying images having a high quality.

2. Description of the Related Art

In general, an LCD apparatus that is a kind of display apparatus precisely controls an optical anisotropy property of liquid crystal to display images. Controlling of the liquid crystal is executed by means of an electric field. For this reason, the liquid crystal is interposed between two electrodes.

The liquid crystal is arranged in a predetermined direction indicated by an alignment groove, and tilted in a predetermined angle in respect to the alignment groove, thereby precisely controlling a light transmittance through the liquid crystal.

FIG. 1 is a cross-sectional view showing an LCD panel of a conventional LCD apparatus.

Referring to FIG. 1, in order to display the image having a high resolution through the LCD panel, the LCD panel requires a structure that is proper to precisely control the small area of the liquid crystal 10. For this purpose, a common electrode 20 to which a reference voltage is applied is disposed on the liquid crystal 10. Pixel electrodes 30, 35 that are divided in accordance with the resolution are formed under the liquid crystal 10, and the pixel electrodes 30 and 35 is opposite to the common electrode 20. The pixel electrodes 30 and 35 are formed not to be electrically short each other. A power supply module 40 is commonly connected with the pixel electrodes 30 and 35 to supply a required power voltage to the pixel electrodes 30 and 35.

When dividing the pixel electrodes 30 and 35 into more than two in order to display images having the high resolution, there is a very small gap W between the pixel electrodes 30 and 35. It is not possible to control the liquid crystal 20 positioned at the gap W. That is, it is not possible to display images through the gap W disposed between the pixel electrodes 30 and 35, so that the quality of the image is lowered due to the light emitted through the gap W.

To prevent the quality of the image from being lowered, the gap W positioned between the pixel electrodes 30 and 35 is screened by means of a light intercepting layer 50 having a band shape. The light intercepting layer 50 screens the power supply module 40, so that a user cannot recognize the power supply module 40.

However, if more than two pixel electrodes 30 and 35 are formed, a portion of the light leaks through the gap W because a horizontal electric field is generated between the pixel electrodes 30 and 35.

The horizontal electric field is formed between the edges of the pixel electrodes 30 and 35 in a concentric circle shape, and the horizontal electric field affects the vertical electric field by which the liquid crystal 10 is arranged ideally. Also, the liquid crystal 10 has a property to be arranged in parallel to directions of the horizontal and vertical electric fields.

When the liquid crystal 10 is disposed in parallel to the horizontal electric field, a reverse tilted region 70 occurs. As shown in FIG. 1, the liquid crystal 10 is tilted reverse at the pixel electrode 30, which is disposed to face a rubbing direction of the alignment groove 65 formed on the alignment layer 60. The liquid crystal 10 in the reverse tilted region 70 cannot be controlled, so that the light is leaked through the reverse tilted region 70. The reverse tilted region 70 is called as a declination line, which causes a low-quality image display.

BRIEF SUMMARY OF THE INVENTION

The present invention solves the aforementioned problems by providing a liquid crystal display capable of displaying an image having a high quality although declination lines are disposed on pixel electrodes.

In one aspect of the invention, there is provided a liquid crystal display apparatus comprising: a TFT substrate having pixels in which first electrodes and power supply means for supplying a power voltage to the first electrodes are respectively formed, and a first alignment layer on which at least one first alignment groove is formed by rubbing in a first rubbing direction, a color filter substrate having second electrodes opposite to the first electrodes, a second alignment layer on which a second alignment groove is formed by rubbing in a second rubbing direction, and red, green and blue color filters, a liquid crystal interposed between the TFT substrate and the color filter substrate, the liquid crystal being tilted by the first and second alignment groove and being twisted when the power voltage is applied to the first and second electrodes, and a light-leakage preventing means for masking a non-effective display region being displaced between the pixels and a light leakage region, the light leakage region being adjacent to the non-effective display region, being displaced over a portion of the first electrodes, a reverse tilted liquid crystal being over the portion of the first electrodes, and the reverse tilted liquid crystal being caused by a rubbing the first alignment groove in the first rubbing direction when the power voltage is applied to the first and second electrodes; and a backlight assembly for providing a light to the liquid crystal display panel.

BRIEF DESCRIPTION OF THE DRAWINGS

The above object and other advantage of the present invention will become more apparently by describing in detail the exemplary embodiments thereof with reference to the accompanying drawings, in which:

FIGS. 18 and 19 is schematic views showing a light-leakage preventing layer and an overlap structure of color filters in the LCD panel driven by a column inversion driving method according to a preferred embodiment of the present invention; and FIG. 20 is a schematic view showing a light-leakage preventing layer in the LCD panel driven by a dot inversion driving method according to a preferred embodiment of the present invention.

DESCRIPTION OF THE PREFERRED EMBODIMENTS

Reference will now be made in detail to the exemplary embodiments of the present invention, examples of which are illustrated in the accompanying drawings. Hereinafter, exemplary embodiments are described with reference to the accompanying drawings.

Figure 1:
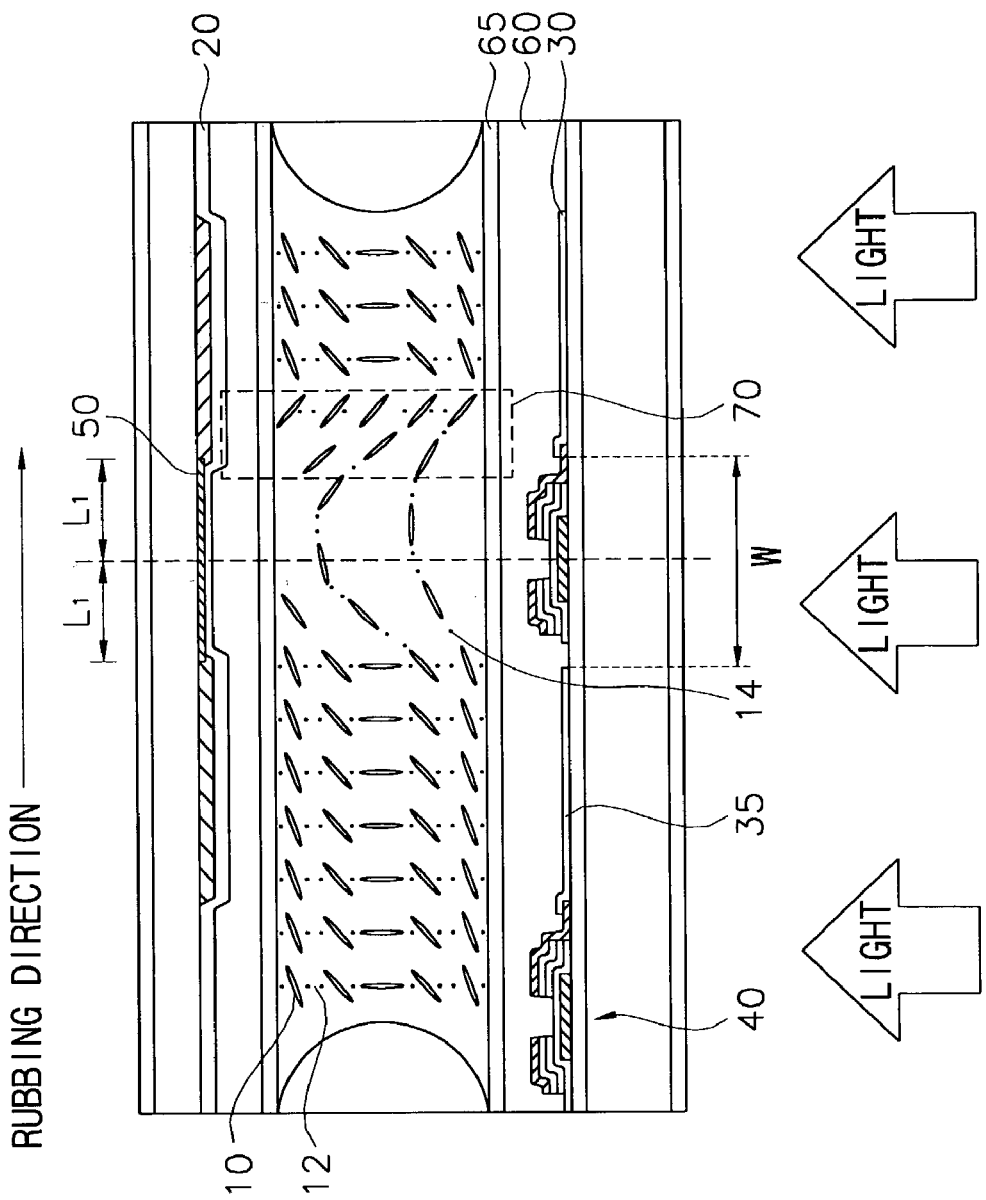
FIG. 1 is a cross-sectional view showing an LCD panel of a conventional LCD apparatus.
Figure 2:
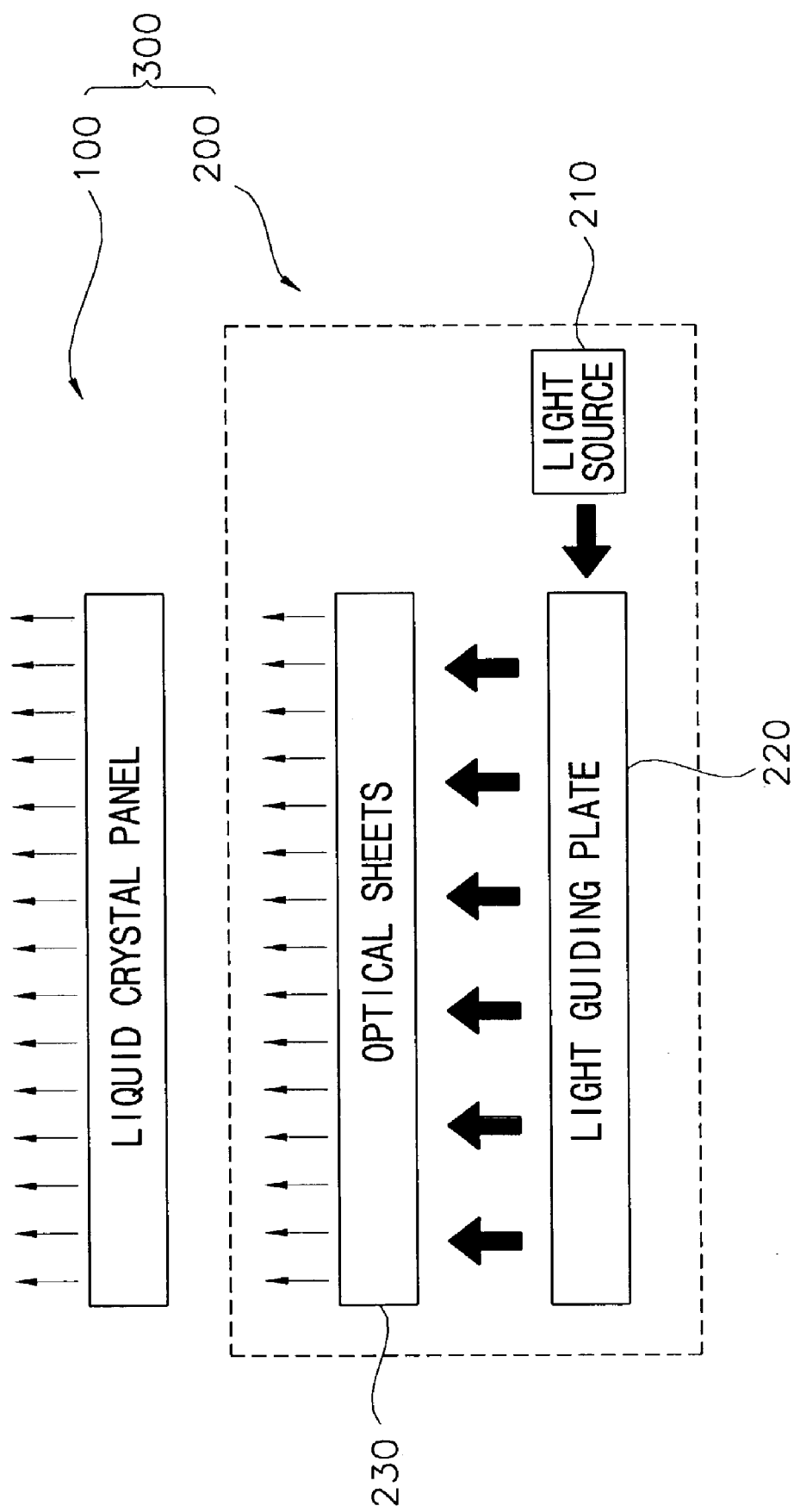
FIG. 2 is a schematic view showing an LCD panel according to a preferred embodiment of the present invention.

FIG. 2 is a schematic view showing an LCD apparatus in accordance with an exemplary embodiment of the present invention.

Referring to FIG. 2, the LCD apparatus 300 includes an LCD panel assembly 100 and a backlight assembly 200.

The backlight assembly 200 includes a light source 210 that generates a line light flux, a light guiding plate 220 that changes the line light flux into a surface light flux, and optical sheets 230 that increase the uniformity of the brightness of the light emitted from the light guiding plate 220. The light emitted from the backlight assembly 200 is incident to the LCD panel assembly 100.

The LCD panel assembly 100 provides a minute-area control in order to control the transmittance of the light emitted from the backlight assembly 200, as a result and displays images.

Figure 3:
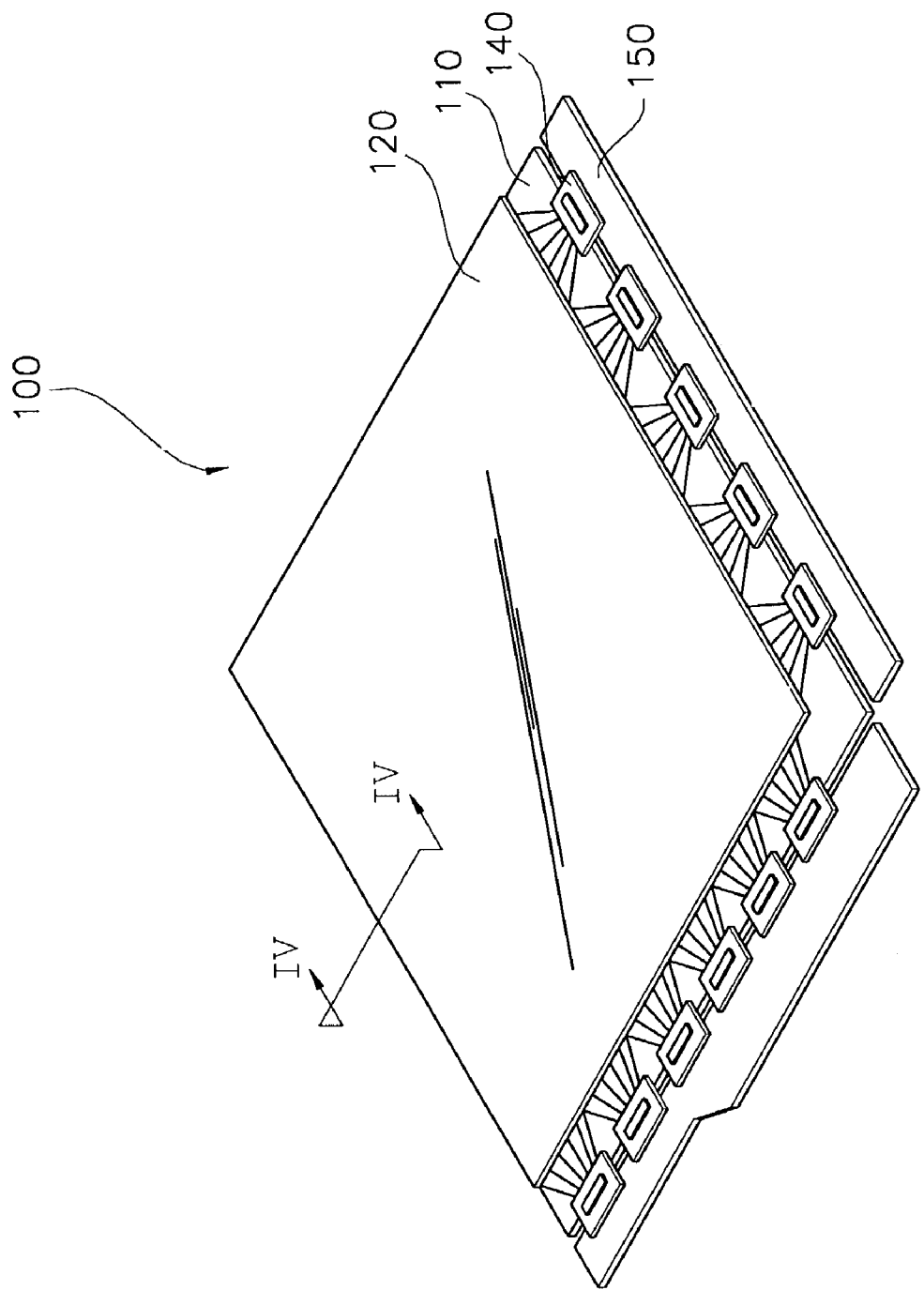
FIG. 3 is a perspective view the LCD panel according to a preferred embodiment of the present invention.
Figure 4:
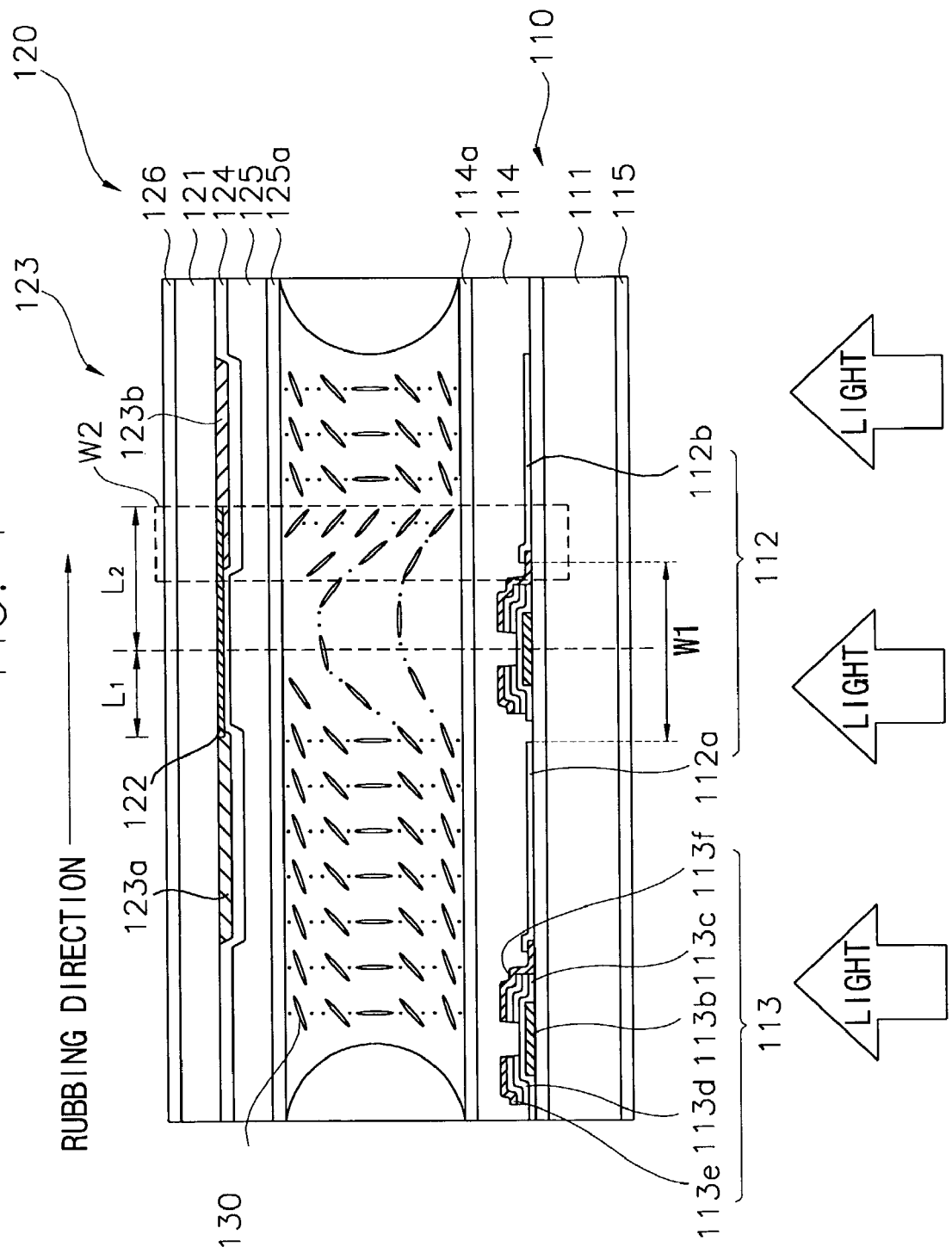
FIG. 4 is a cross-sectional view cut along a line IV-IV showing a structure of the LCD panel shown in FIG. 3.

FIG. 3 is a perspective view showing an exterior of the LCD panel assembly shown in FIG. 2 and FIG. 4 is a sectional view showing an interior of the LCD panel assembly shown in FIG. 3.

Referring to FIG. 3, the LCD panel assembly 100 includes a TFT substrate 110, the liquid crystal 130, a color filter substrate 120, a tape carrier package (TCP) 140, and a driving printed circuit board (driving PCB) 150.

As shown in FIG. 4, the TFT substrate 110 includes a glass substrate 111, a pixel electrode 112, a power supply module 113, a first alignment layer 114 and a first alignment groove 114a. The reference numeral 115 indicates a polarizing plate 115.

Figure 5:
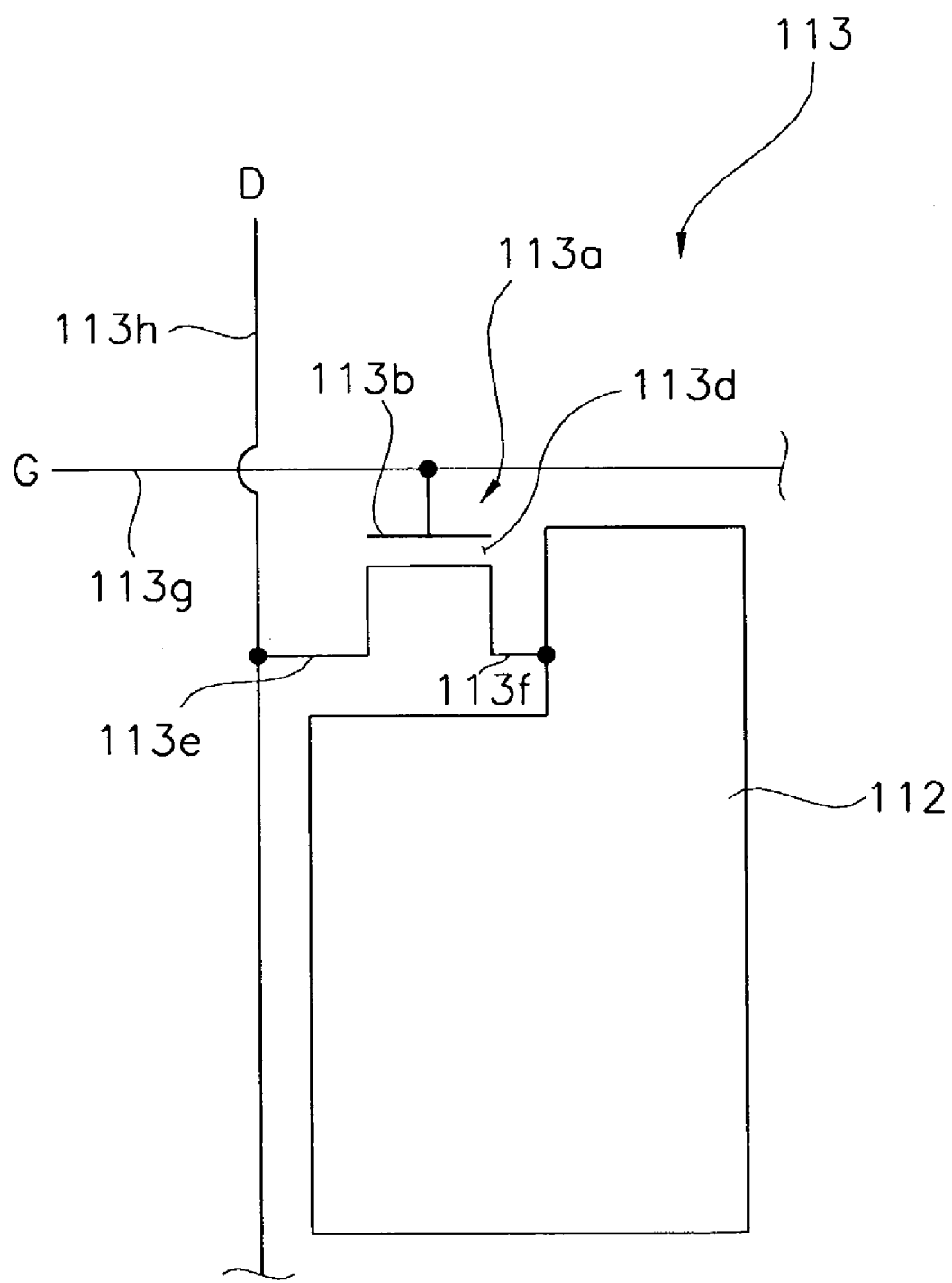
FIG. 5 is a circuit diagram showing a power supply module and a pixel electrode according to the present invention.

Referring to FIGS. 4 and 5, the power supply module 113 is disposed on the glass substrate 111. The power supply module 113 includes TFTs 113a and common signal lines 113g and 113h. The TFTs 113a are disposed on the glass substrate 111 in matrix, and the number of TFTs 113a is decided in accordance with a resolution of the LCD panel assembly 100. For example, when the resolution is 800×600, the LCD panel assembly 100 requires 800×600×3 TFTs to display the image in a full color.

Each of the TFTs 113a disposed on the glass substrate 113a includes two signal input terminals and one signal output terminal. The common signal lines 113g and 113h are used to drive the TFTs 113a.

Hereinafter, the connection between the TFTs 113a and common signal lines 113g and 113h will be described with reference to FIGS. 4 to 7.

On the glass substrate 111, a plurality of gate electrode 113b operated as input terminals of the TFTs 113a are formed in the matrix. The gate electrodes 113b are connected with one of the common signal lines operated as gate lines 113g. The gate lines 113g are formed together with the gate electrode 113b.

An insulating layer 113c is formed on the gate electrodes 113b, and a channel layer 113d is partially formed on the insulating layer 113c corresponding to the gate electrode 113b. The channel layer 113d includes a semiconductor material, such as an amorphous silicon, a polycrystalline silicon or a single crystal silicon. The channel layer 113d has a nonconductive property when the power voltage is not applied to the gate electrode 113b, and has a conductive property when the power voltage is applied thereto.

On the channel layer 113d, $n^+$ amorphous silicon thin film where $n^+$ ion is implanted into the amorphous silicon may be formed. The implanted amorphous silicon layer is divided into first and second portions so as not to be electrically short each other, and is called as an ohmic contact layer.

Source electrodes 113e corresponding to one of the two input terminals of the TFTs 113f are formed on the first portion of the two ohmic contact layers, and the source electrodes 113e are connected with a data line 113h arranged in the column direction, which is one of the common signal lines 113g and 113h. A drain electrode 113f operated as signal output terminals of the TFTs 113a are formed on the second portion of the two ohmic contact layers.

As aforementioned above, the power supply module 113 has a circuit configuration that is proper to supply the power voltage to the drain electrodes 113f of the TFTs 113a. It means that the power supply module 113 can supply the power voltage having a different power voltage according to positions of the glass substrate divided by the number of the TFTs 113a, respectively.

Pixel electrodes 112 are formed on the corresponding drain electrodes 113f, and the pixel electrodes 112 are formed not to be electrically short each other.

Referring to FIG. 4, there exists an empty space W1 between a first pixel electrode 112a and a second pixel electrode 112b. Hereinafter, the empty space W1 between the first and second pixel electrodes 112a and 112b is defined as a non-effective display region W1.

Figure 6:
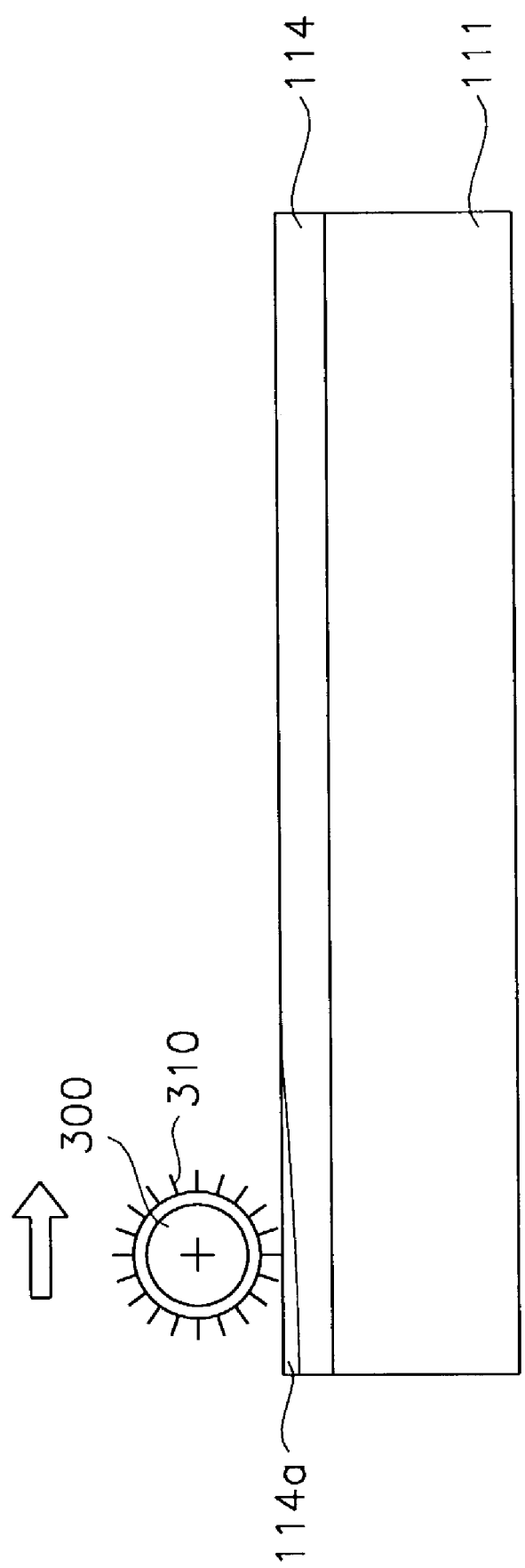
FIG. 6 is a schematic view showing a method of forming an alignment groove on an alignment layer disposed on a TFT substrate according to a preferred embodiment of the present invention.
Figure 7:
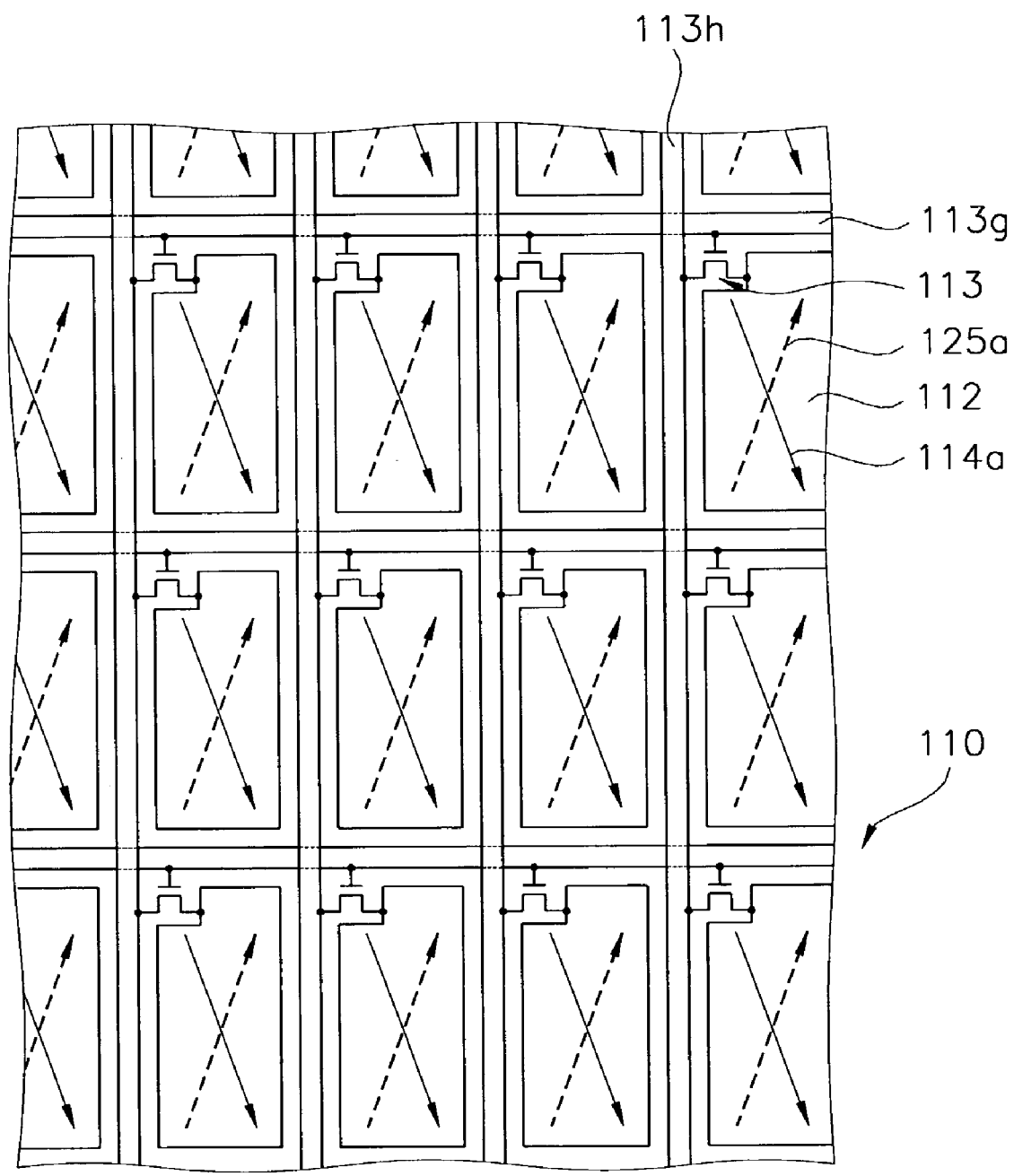
FIG. 7 is a schematic view showing a structure of the TFT substrate according to a preferred embodiment of the present invention.

On the other hand, a first alignment layer 114 comprised of a polyamide material is formed over the glass substrate 111 on which the pixel electrodes 112 are formed. A rubbing roller 300 wound with a rubbing cloth 310 makes a first alignment groove 114a on the first alignment layer 114 in a predetermined direction as shown in FIG. 6.

The color filter substrate 120 is disposed on the TFT substrate 110. The color filter substrate 120 includes a glass substrate 121, a light-leakage preventing layer 122, color filters 123 (123a, 123b), a common electrode 124, a second alignment layer 125 and a second alignment groove 125a. The reference numeral 126 indicates a polarizing plate.

The color filters 123 includes a red color filter 123a that emits a light having a wavelength of red light, a green color filter 123b that emits a light having a wavelength of green light and a blue color filter (not shown) that emits a light having a wavelength of blue light.

The red and green color filters 123a and 123b are formed in positions corresponding to the first and second pixel electrodes 112a and 112b, respectively, and the light-leakage preventing layer 122 is formed between the red, green and blue color filters 123. A transparent common electrode 124 is disposed over the glass substrate 121 of the color filter substrate 120, and then a second alignment layer 125 having a second alignment groove 125a is disposed on the common electrode 124.

The second alignment groove 125a is formed in a different direction in comparison with the first alignment groove 114a. The liquid crystal 130 is injected between the TFT substrate 110 and the color filter substrate 120, and is sealed therebetween with a sealant, and the LCD panel 100 is manufactured.

The non-effective display region W1 is formed between the first and second pixel electrodes 112a and 112b, and the non-effective display region may be formed on a portion of the second pixel electrode 112b due to a horizontal electric field. The horizontal electric field is disposed on the second pixel electrode 112b in a direction that is related to the direction in which the first alignment groove 114a is disposed.

The region in which the horizontal electric field is disposed instead of a vertical electric field is defined as a reverse tilted region W2.

As aforementioned above, the position of the reverse tilted region W2 is decided by means of the first alignment groove 114a of the first alignment layer 114.

Figure 8:
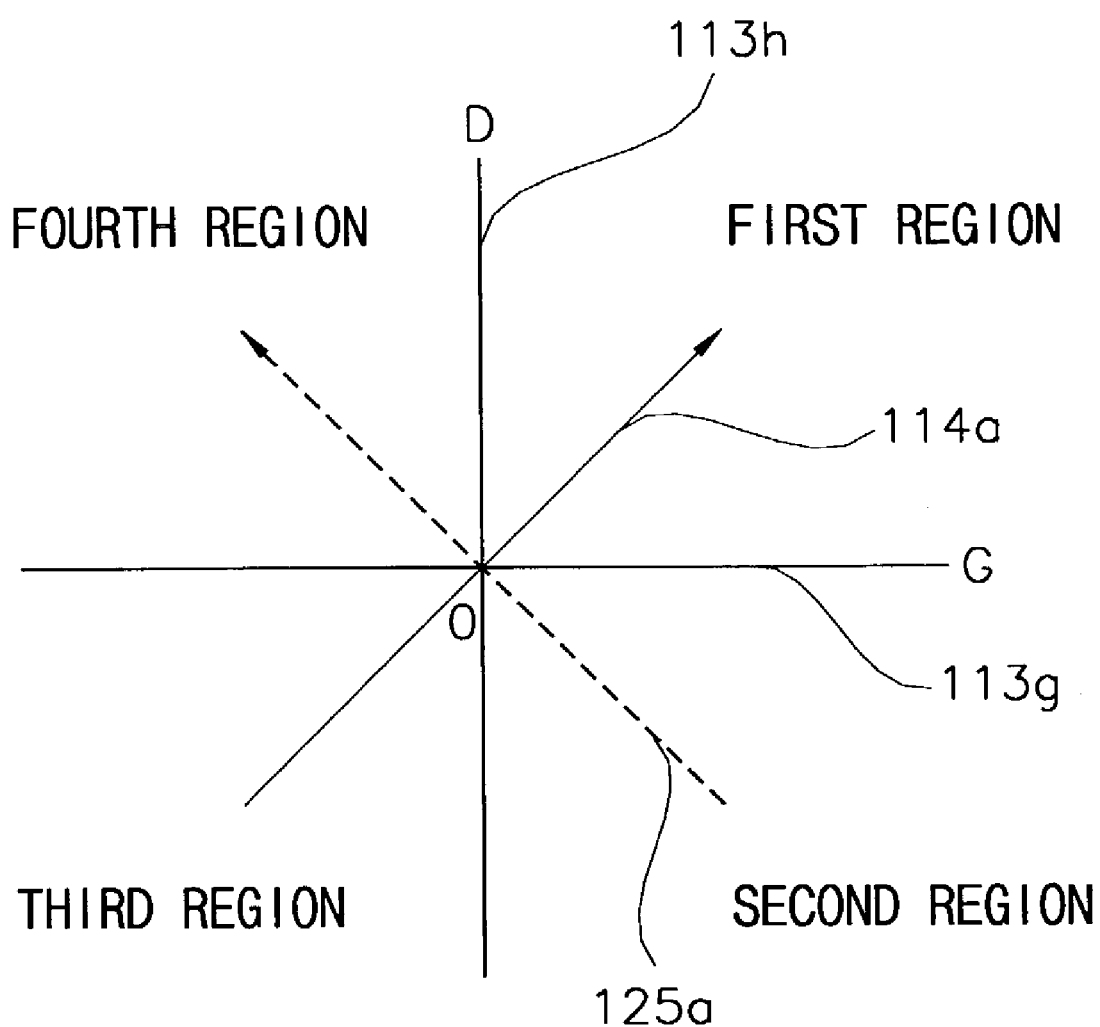
FIG. 8 is a coordinate system showing directions of first and second alignment grooves of TFT and color filter substrates according to the present invention.

In order to define the direction of the first alignment groove 114a, the gate line 113g is set up as an X-axis, and the data line 113h orthogonal to the gate line 113g is set up as a Y-axis. The point that the gate line 113g meets with the data line 113h is defined as an origin "o". As shown in FIG. 8, a first region has plus X and Y values, a second region has plus X value and minus Y value, a third region has minus X and Y values, and a fourth region has minus X value and plus Y value.

Figure 9:
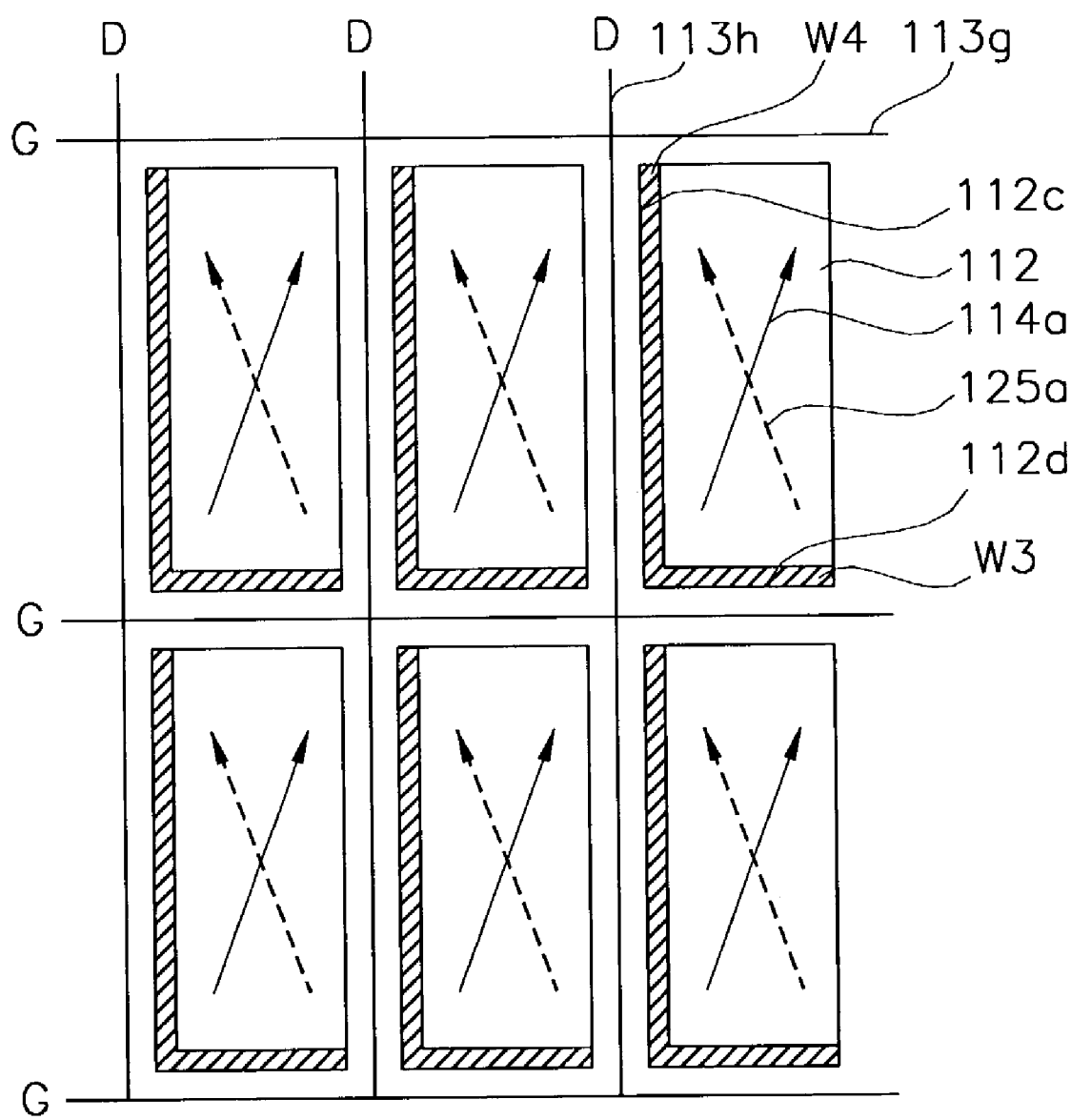
FIGS. 9 to 15 is schematic views showing structures of the pixel electrodes and reverse tilted regions according to a preferred embodiment of the present invention.

As shown in FIGS. 8 and 9, the first alignment groove 114a formed on the pixels 112 of the TFT substrate 110 is rubbed in the direction that is from the third region toward the first region, and the second alignment groove 125a formed on the color filter substrate 120 is rubbed in the direction that is from the second region toward the fourth region. Thus, as shown in FIG. 9, the reverse tilted region W2 of the liquid crystal 130 is formed on edge portions 112c and 112d of the pixel electrodes 112, the edge portions 112c and 112d are adjacent to each other and is opposite to the rubbing direction of the first alignment groove 114a. The reverse tilted region W2 of the liquid crystal 130 is formed on every pixel electrode 112.

As shown in FIG. 9, the reverse tilted region formed on the edge portion 112d parallel to the gate line 113g is defined as a first reverse tilted region W3 and the reverse tilted region formed on the edge portion 112c parallel to the data line 113h is defined as a second reverse tilted region W4. Namely, The reverse tilted region W2 is comprised of the first and second reverse tilted region W3 and W4.

Figure 10:
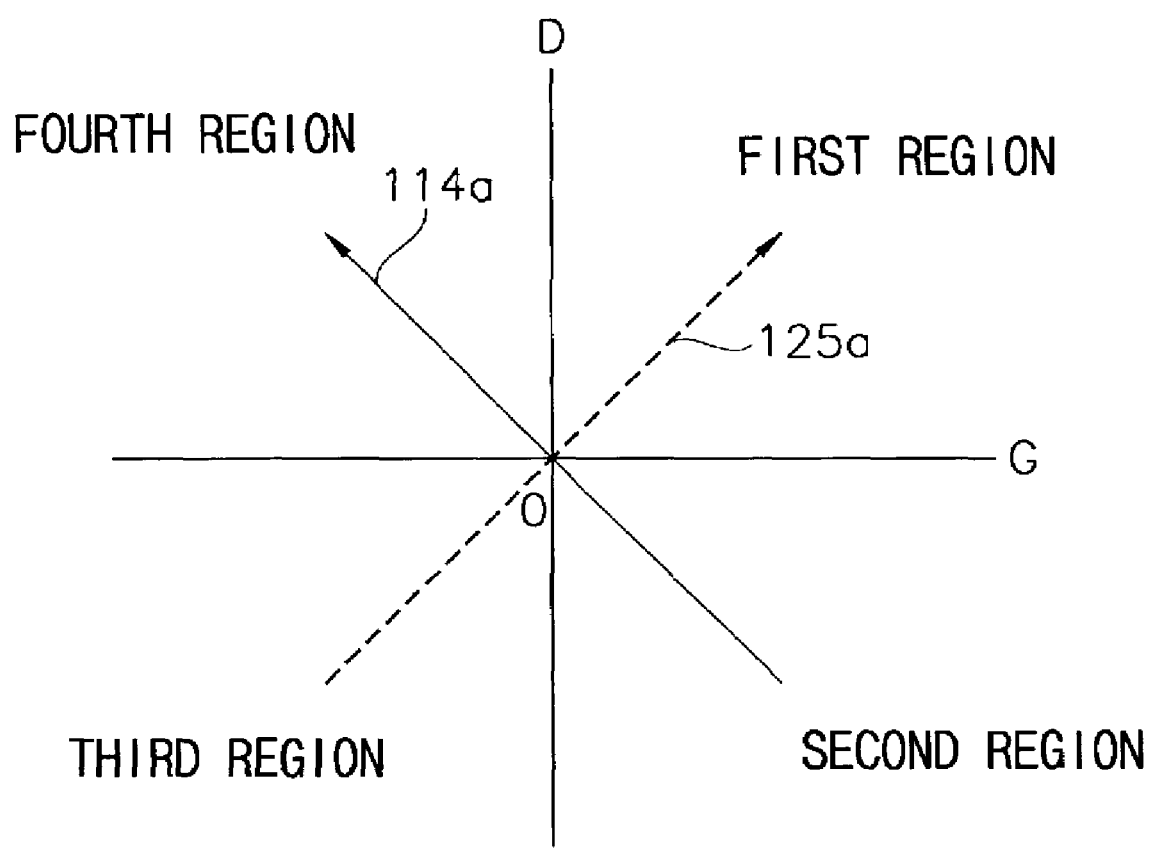

As another exemplary embodiment, referring to the FIG. 10, the first alignment groove 114a formed on the pixels 112 of the TFT substrate 110 is rubbed in the direction that is from the second region toward the fourth region, and the second alignment groove 125a formed on the color filter substrate 120 is rubbed in the direction that is from the third region toward the first region. Thus, the reverse tilted region W2 of the liquid crystal 130 is formed on edge portions 112d and 112f of the pixels electrode 112, the edge portions 112d and 112f are adjacent to each other and are opposite to the rubbing direction of the first alignment groove 114a. The reverse tilted region W2 of the liquid crystal 130 is formed on every pixel electrode 112.

Figure 11:
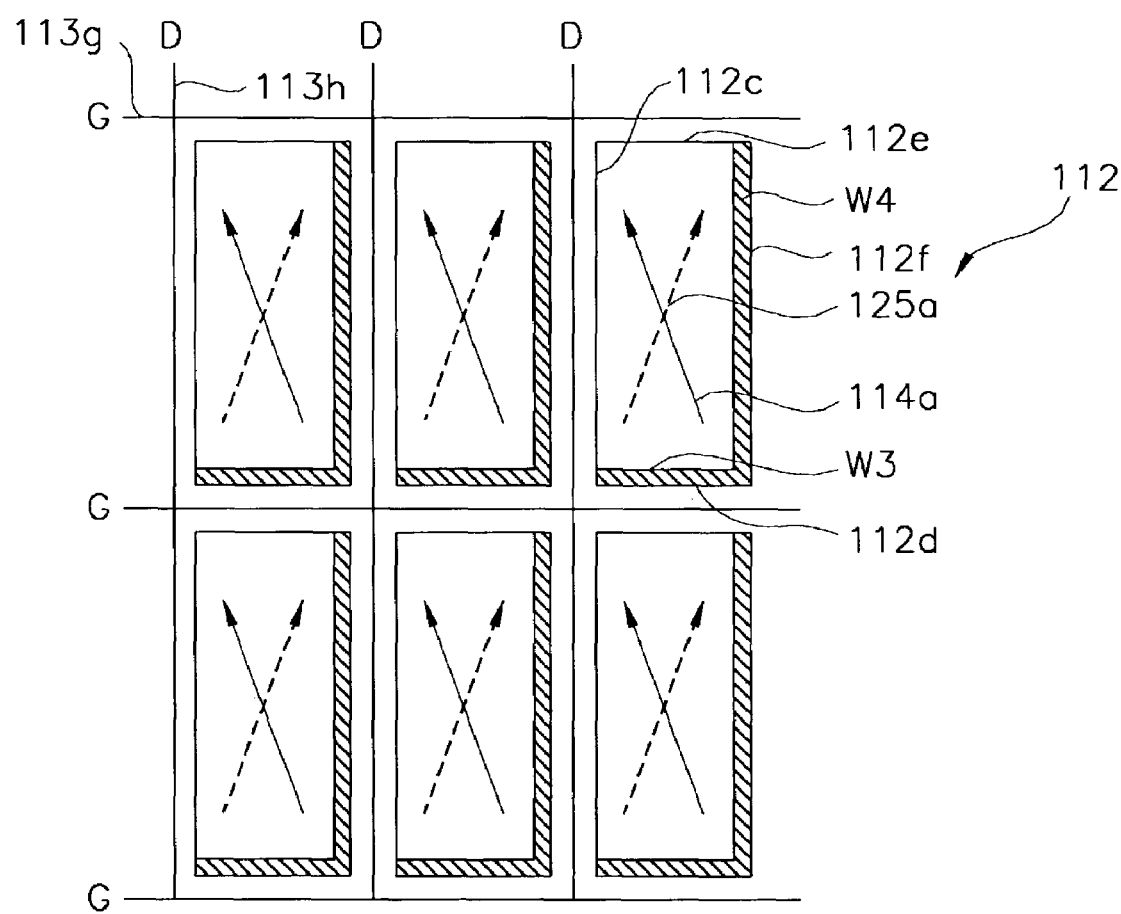

Referring to FIG. 11, the reverse tilted region formed on the edge portion 112d parallel to the gate line 113g is defined as the first reverse tilted region W3, and the reverse tilted region formed on the edge portion 112f parallel to the data line 113h is defined as a second reverse tilted region W4.

Figure 12:
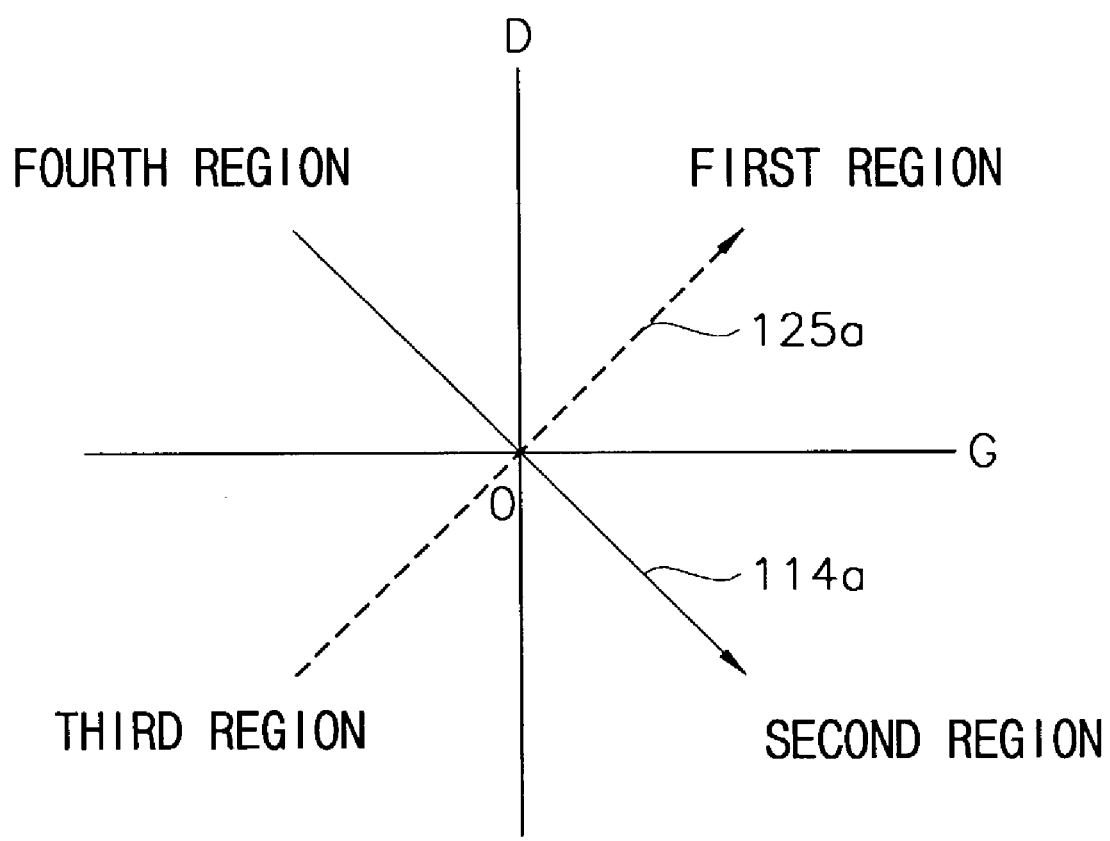

As another exemplary embodiment, referring to FIG. 12, the first alignment groove 114a formed on the pixels 112 of the TFT substrate 110 is rubbed in the direction that is from the fourth region toward the second region, and the second alignment groove 125a formed on the color filter substrate 120 is rubbed in the direction that is from the third region toward the first region. Thus, the reverse tilted region W2 of the liquid crystal 130 is formed on edge portions 112c and 112e of the pixel electrodes 112, the edge portions 112c and 112e are adjacent to each other and are opposite to the rubbing direction of the first alignment groove 114a. The reverse tilted region W2 of the liquid crystal 130 is formed on every pixel electrode 112.

Figure 13:
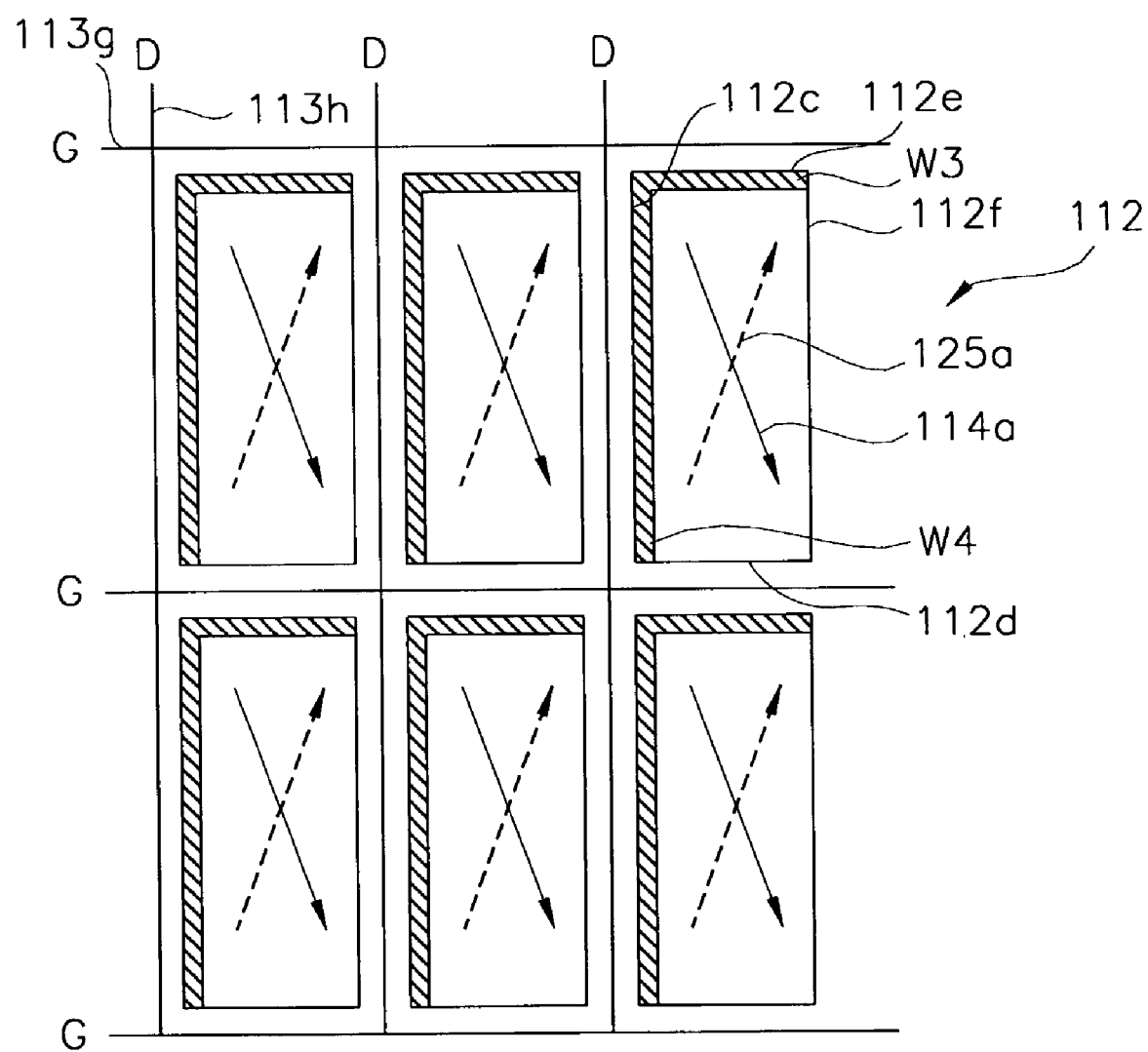

Referring to FIG. 13, the reverse tilted region formed on the edge portion 112e parallel to the gate line 113g is defined as the first reverse tilted region W3, and the reverse tilted region formed on the edge portion 112c parallel to the data line 113h is defined as the second reverse tilted region W4.

Figure 14:
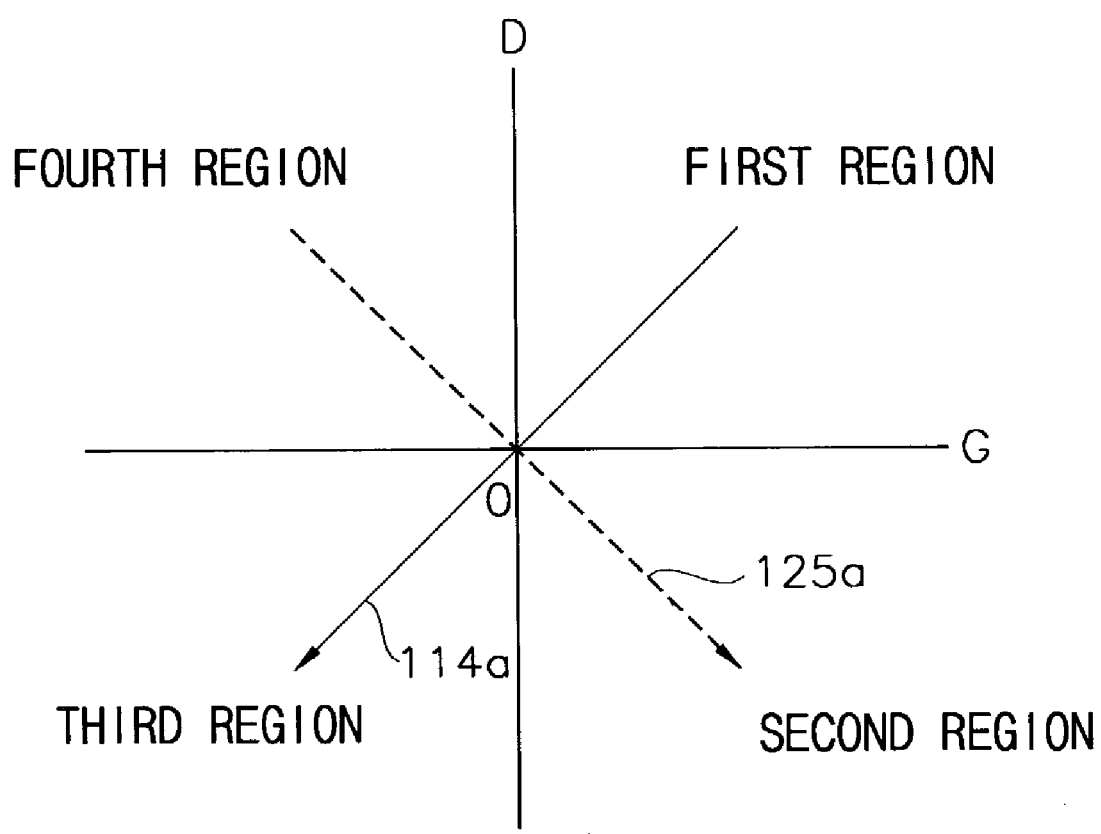

As another exemplary embodiment, referring to FIG. 14, the first alignment groove 114a formed on the pixels 112 of the TFT substrate 110 is rubbed in the direction that is from the first region toward the third region, and the second alignment groove 125a formed on the color filter substrate 120 is rubbed in the direction that is from the fourth region toward the second region. Thus, the reverse tilted region W2 of the liquid crystal 130 is formed on edge portions 112e and 112f of the pixels 112, the edge portions 112e and 112f are adjacent to each other and are opposite to the rubbing direction of the first alignment groove 114a. The reverse tilted region W2 of the liquid crystal 130 is formed on every pixel 112.

Figure 15:
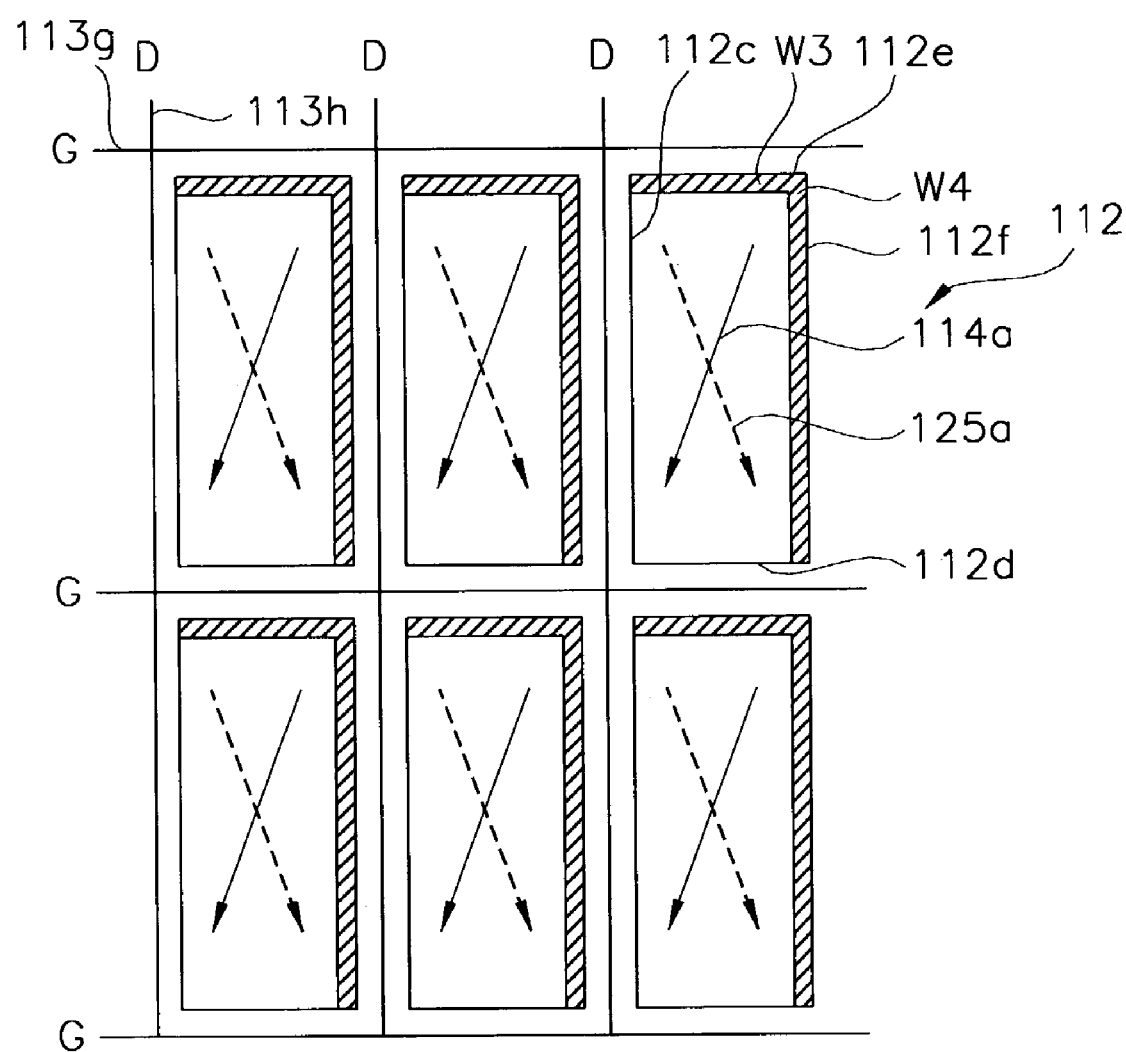

As shown in FIG. 15, the reverse tilted region formed on the edge portion 112e parallel to the gate line 113g is defined as the first reverse tilted region W3, and the reverse tilted region formed on the edge portion 112f parallel to the data line 113h is defined as the second reverse tilted region W4.

Referring to FIGS. 9 to 15, the first reverse tilted region W3 is formed only on one pixel electrode of the first and second pixel electrodes 112a and 112b adjacent to each other, i.e., on the second pixel electrode 112b. Similarly, the second reverse tilted region W4 is formed only on one pixel electrode of the first and second pixel electrodes 112a and 112b adjacent to each other, i.e., on the second pixel electrode 112b.

The liquid crystal 130 is not controlled in the first and second reverse tilted regions W3 and W4, so that the light leakage occurs within the first and second reverse tilted regions W3 and W4. This means that the first and second reverse tilted regions W3 and W4 as well as the non-effective display region W1 have to be screened to prevent the light from being leaked. As shown in FIG. 4, the light-leakage preventing layer 122 covers the first and second reverse tilted regions W3 and W4 and the non-effective region W1, and is comprised of a chromium (Cr) material.

One edge of the light-leakage preventing layer 122 is positioned at a boundary between the pixel electrode 112a, on which the first and second reverse tilted regions W3 and W4 are not formed, and the non-effective display region W1. The light-leakage preventing layer 122 is extended to the boundary of the pixel electrode 112b, on which the first and second reverse tilted regions W3 and W4 are formed, and the first and second reverse tilted regions W3 and W4. Namely, the other edge of the light-leakage preventing layer 122 is positioned at the boundary of the pixel electrode 112b and the reverse tilted regions W3 and W4

The intensity of the light leaked through the first reverse tilted region W3 is different from that of the light leaked through the second reverse tilted region W4. The intensity is varied according to a driving method of the LCD apparatus.

Figure 16:
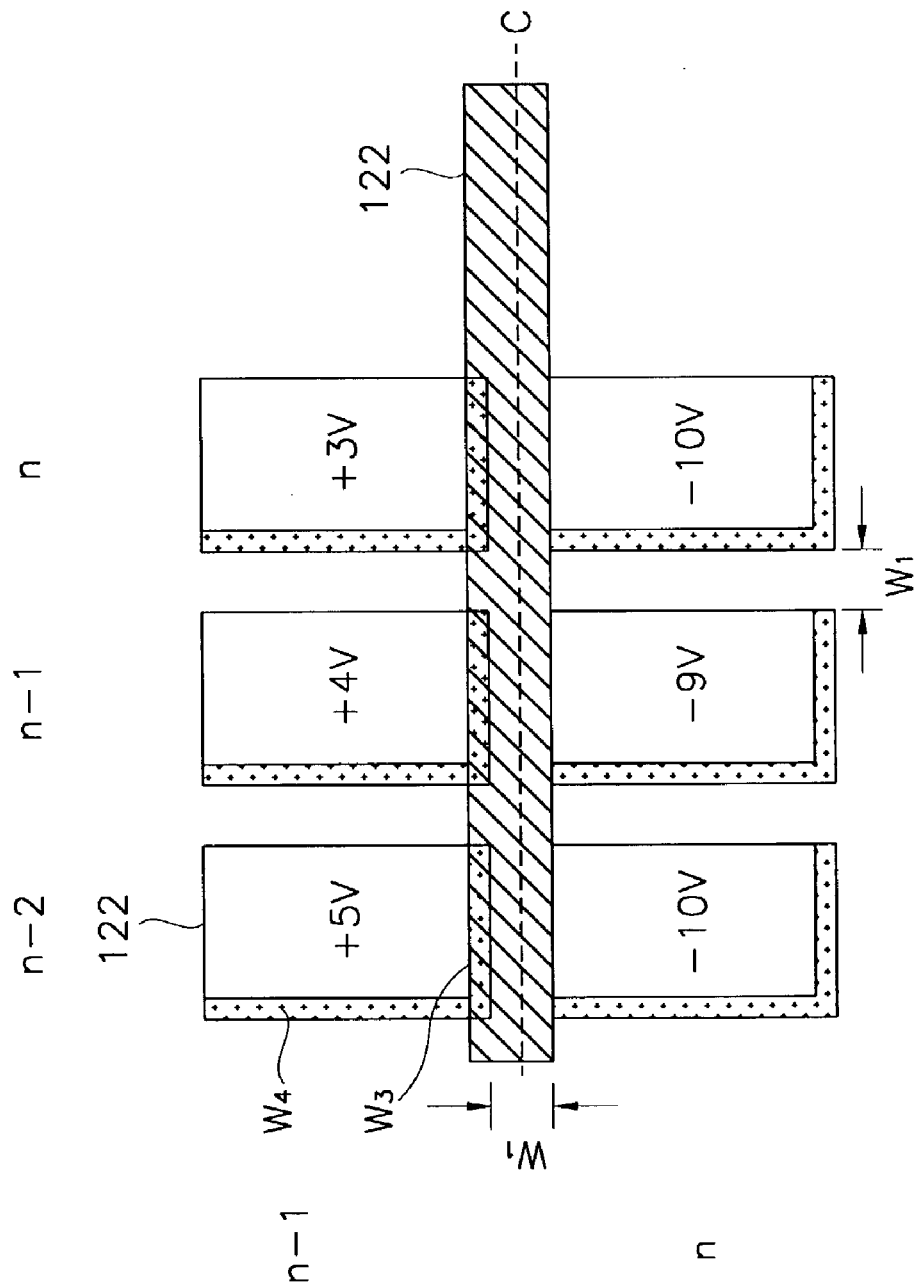
FIGS. 16 and 17 is schematic views showing a light-leakage preventing layer and an overlap structure of color filters in the LCD panel driven by a line inversion driving method according to a preferred embodiment of the present invention.

As shown in FIG. 16, in the pixel electrodes formed in N×N matrix, a line inversion driving method is a method in which an electric field having a plus (+) polarity is applied to the pixel electrodes arranged in the (n−1) th column and an electric field having a minus (−) polarity is applied to the pixel electrodes arranged in the (n) th column.

When the electric field is applied to the pixel electrodes by the line inversion driving method, the difference of the electric field between the pixel electrodes arranged in the same row is larger than the difference of the electric field between the pixel electrodes arranged in adjacent row.

For example, as shown in FIG. 16, when the power voltages applied to the pixel electrodes arranged in (n−1) th column are +5, +4 and +3 volts and the power voltages applied to the pixel electrodes arranged in (n) th column are −10, −9 and −10 volts, respectively, the difference of the electric field between the pixel electrodes arranged in the (n−1) th row or the difference of the electric field between the pixel electrodes arranged in the (n) th row is about Δ 1 volt. However, the difference of the electric field between the (n−2) th, (n−1) th, (n) th column pixel electrodes arranged in the (n−1) th row and the (n−2) th, (n−1) th, (n) th column pixel electrodes arranged in the (n) th column, respectively, is about Δ 10 volts. Thus, the image displayed through the first reverse tilted region W3 has a worse quality than that of the image displayed through the second reverse tilted region W4.

When the line inversion driving method is used, the first reverse tilted region W3 and the non-effective display region W1 have to be covered by means of the light-leakage preventing layer 122. Specifically, the light-leakage preventing layer 122 is formed in a direction parallel to the gate line 113g. The reference symbol C indicates a center line between two pixel electrodes adjacent to each other.

Although the first reverse tilted region W3 and the non-effective display region W1 is screened by the light-leakage preventing layer 122, the light leaked from the second reverse tilted region W4 still exist. Accordingly, the second reverse tilted region W4 has to be screened. The color filters is overlapped, as shown in FIG. 17 to screen the second reverse tilted region W4.

As shown in The red color filter 123a, the green color filter 123b and the blue color filter 123c have a band shape in order to cover the pixel electrodes arranged in (n−2) th, (n−1) th and (n) th rows, respectively.

Figure 17:
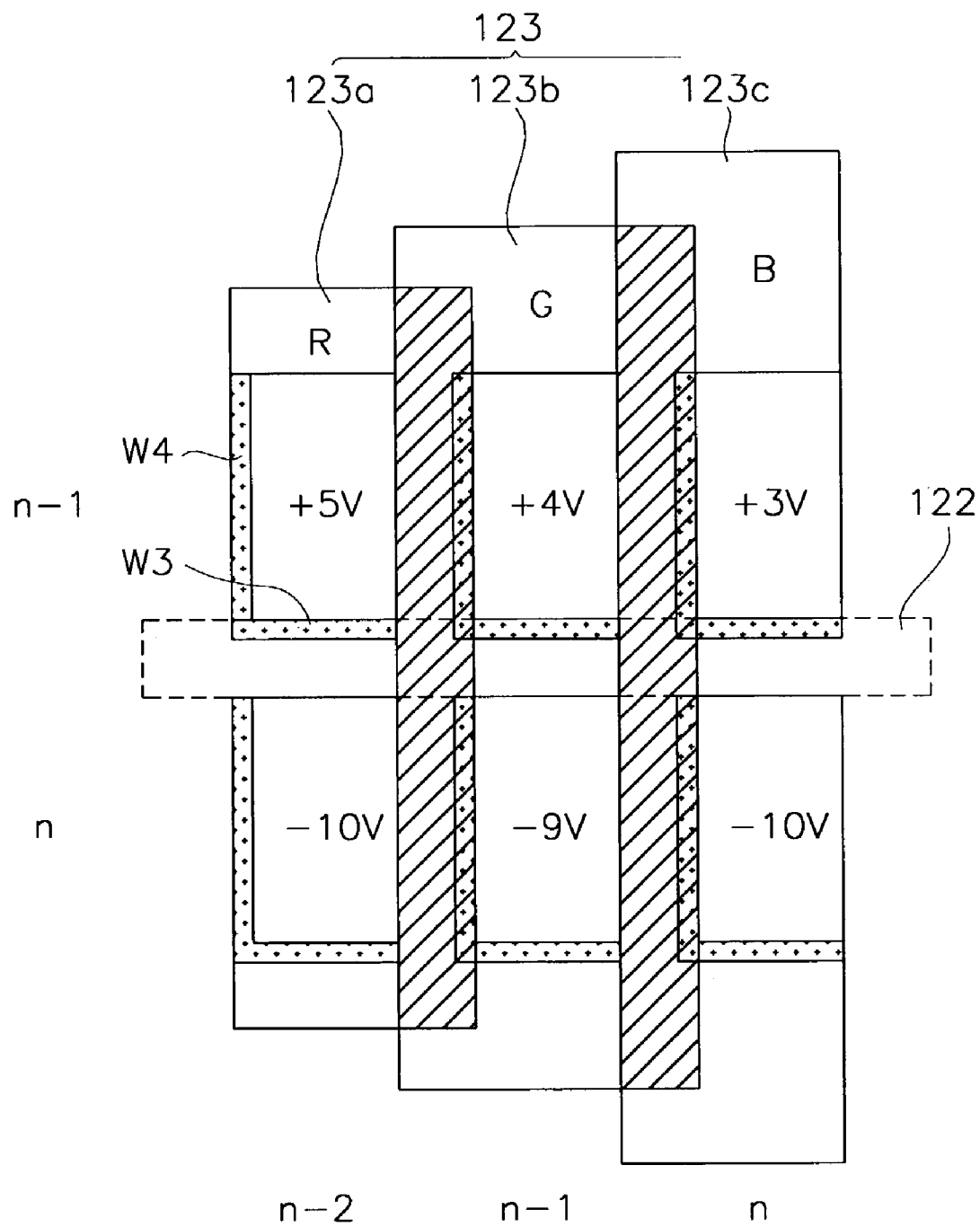

Referring to FIG. 17, the overlap between the color filters is disposed in the non-effective display region W1 and the second reverse tilted region W4. The red color filter 123a covers the pixel electrodes having +5 volts and −10 volts, and extends to the second reverse tilted region W4 of the pixel electrodes having +4 volts and −9 volts.

The green color filter 123b covers the pixel electrodes having +4 volts and −9 volts, and extends to the edges of the pixel electrodes having +5 volts and −10 volts and the second reverse tilted region W4 of the pixel electrodes having +3 volts and −10 volts.

The blue color filter 123c covers the pixel electrodes having +3 volts and −10 volts, and extends to the edges of the pixel electrodes having +4 volts and −9 volts.

As a result, the red, green and blue color filters 123a, 123b and 123c are overlapped with each other in a hatched area. The light transmittance decreases at the areas in which the red and green color filters are overlapped and the green and blue color filters are overlapped, so that the overlapped areas covers the non-effective display region W1 and the second reverse tilted region W4.

Figure 18:
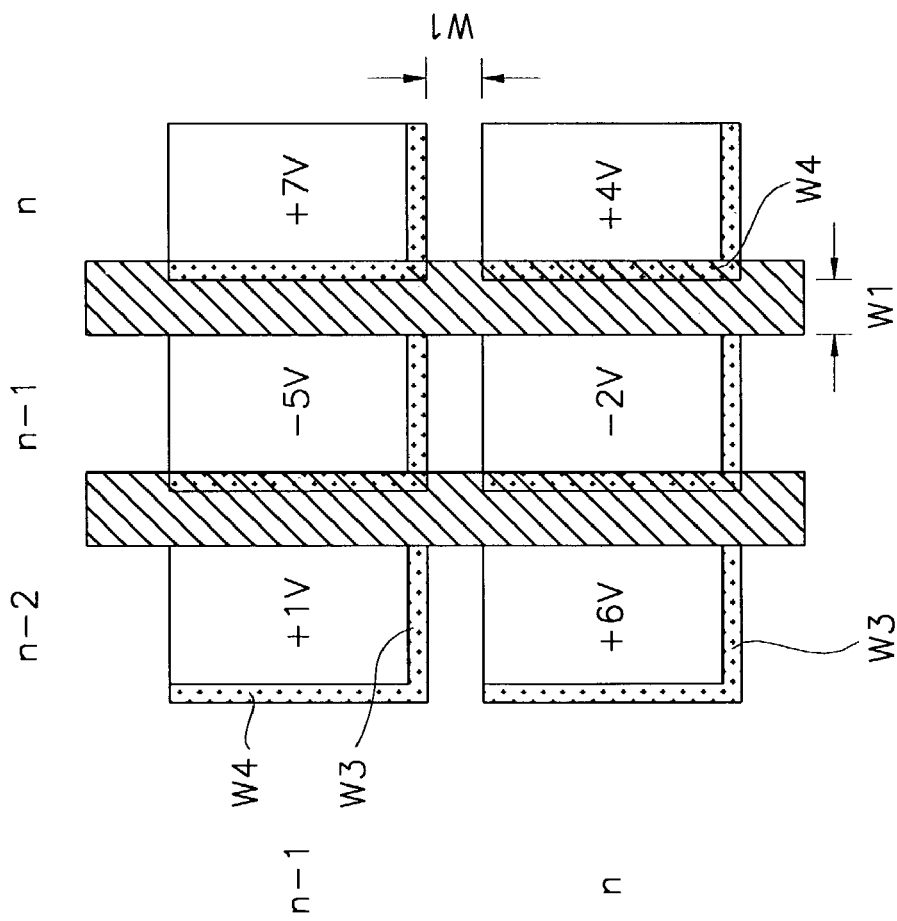

FIGS. 18 and 19 is a view showing an LCD panel driven by a column inversion driving method.

As shown in FIG. 18, in the pixel electrodes formed in N×N matrix, the column inversion driving method is a method in which the electric field having the plus (+) polarity is applied to the pixel electrodes arranged in (n−2) th column, the electric field having the minus (−) polarity is applied to the pixel electrodes arranged in (n−1) th column and the electric field having the plus (+) polarity is applied to the pixel electrodes arranged in (n) th column.

When the electric field is regularly formed on the pixel electrodes by the column inversion driving method, the difference of the electric field between the pixel electrodes arranged in same column is smaller than that of the electric field between the pixel electrodes arranged in adjacent columns.

For example, when the power voltages applied to the (n−1) th and (n) th row pixel electrodes arranged in (n−2) th column have +1 and +6 volts, respectively, the power voltages applied to the (n−1) th and (n) th row pixel electrodes arranged in (n−1) th column have −5 and −2 volts, respectively, and the power voltages applied to the (n−1) th and (n) th row pixel electrodes arranged in (n) th row have +7 and +4 volts, respectively, the difference of the electric field between the (n−1) th and (n) th row pixel electrodes arranged in the (n−2) th, (n−1) th or (n) th column is smaller than that of the adjacent column pixel electrodes arranged in the (n−2) th, (n−1) th and (n) th column. Thus, the image displayed through the second reverse tilted region W4 has a lower quality than that of the image displayed through the first reverse tilted region W3.

When the column inversion driving method is used, the second reverse tilted region W4 and the non-effective display region W1 are covered by means of the light-leakage preventing layer 122. Specifically, the light-leakage preventing layer 122 is formed in a direction parallel to the data line 113h. The light-leakage preventing layer 122 is formed to cover a minimum portion of the pixel electrodes, on which the second reverse tilted region W4 in not formed, adjacent to the pixel electrodes, on which the second reverse tilted region W4 in formed.

Although the second reverse tilted region W4 and the non-effective display region W1 is screened by the light-leakage preventing layer 122, the light leaked from the first reverse tilted region W3 still exist. Accordingly, the first reverse tilted region W3 has to be screened. The color filters is overlapped, as shown in FIG. 19 to screen the first reverse tilted region W3.

The red color filter 129a, the green color filter 129b and the blue color filter (not shown) have a band shape that covers the pixel electrodes arranged in (n−1) th and (n) th rows.

Referring to FIG. 19, the overlap of the color filters is disposed in the non-effective display region W1 and the first reverse tilted region W3. Specifically, the red color filter 129a covers the whole pixel electrodes having +1, −5 and +7 volts, and extends to the edges of the pixel electrodes having +6, −2 and +4 volts.

The green color filter 129b covers the whole pixel electrodes having +6, −2 and +4 volts, and extends to the first reverse tilted region W3 of the pixel electrodes having +1, −5 and +7 volts.

Accordingly, as shown in FIG. 19, the red and green color filters 129a and 129b are overlapped with each other in the hatched area. The light transmittance decreases at the areas in which the red and green color filters 129a and 129b are overlapped, so that the overlapped area covers the non-effective display region W1 and the first reverse tilted region W3.

FIG. 20 is a view showing an LCD panel driven by a dot inversion driving method.

According to the dot inversion driving method, the polarities of the pixel electrodes are inverted in each of column and row lines. When driving the LCD panel with the dot inversion driving method, the amount of the light leaked through the first and second reverse tilted regions W3 and W4 increases than that of the line and column inversion driving methods, so that the method of overlapping the color filters cannot efficiently preventing the quality of image from being lowered.

In this case, the first and second reverse tilted regions W3 and W4 and the non-effective display region W1 have to be covered by means of the light-leakage preventing layer 122, thereby increasing the quality of the image displayed through the reverse tilted region W2.

According to the aforementioned LCD, the reverse tilted regions of the liquid crystal that causes light leakages are covered by means of the light-leakage preventing layer or by overlapping the color filters each other.

Thus, it possible to prevent the light from being leaked through the reverse tilted regions without increasing the size of the light-leakage preventing layer and decreasing an opening ratio of the pixels by optimizing the position of the light-leakage preventing layer.

This invention has been described above with reference to the aforementioned embodiments. It is evident, however, that many alternative modifications and variations will be apparent to those having skills in the art in light of the foregoing description. Accordingly, the present invention embraces all such alternative modifications and variations as fall within the spirit and scope of the appended claims.

What is claimed is:

1. A liquid crystal display apparatus comprising:
   a liquid crystal display panel including
      a TFT substrate having pixels in which first electrodes and power supply line that supplies a power voltage to the first electrodes are respectively formed, and a first alignment layer on which at least one first alignment groove is aligned in a first rubbing direction,
      a color filter substrate having second electrodes opposite to the first electrodes, a second alignment layer on which a second alignment groove is aligned in a second rubbing direction, and red, green and blue color filters,
      a liquid crystal interposed between the TFT substrate and the color filter substrate, and
      a light-leakage preventing unit that masks a non-effective display region being displaced between the pixels and a light leakage region, the light leakage region being adjacent to the non-effective display region, being displaced over a portion of the first electrodes, a reverse tilted liquid crystal being over the portion of the first electrodes, and the reverse tilted liquid crystal being caused by the first alignment groove in the first rubbing direction when the power voltage is applied to the first and second electrodes; and
   a backlight assembly that provides a light to the liquid crystal display panel,
   wherein the light leakage preventing unit is displaced over only two adjacent sides of each of the first electrodes.

2. The apparatus of claim 1, wherein the light leakage region is extended from an edge of the first electrodes surrounded by the non-effective display region, the edge facing the first robbing direction, towards a center of the surface of the first electrodes by a predetermined width.

3. The apparatus of claim 2, wherein the light leakage region is formed in a same position of each of the first electrodes.

4. The apparatus of claim 2, wherein the light leakage region comprises a first and a second light leakage region, the first light leakage region being formed in a first edge of the first electrode, the first edge facing the first rubbing direction, and the second light leakage region being formed in a second edge adjacent to the first edge.

5. The apparatus of claim 4, wherein the first light leakage region is parallel with a first line that drives the power supply line, and the second light leakage region is parallel with a second line that supplies the power voltage to the first electrodes through the power supply line.

6. The apparatus of claim 5, wherein the power supply line supplies the power voltage to the first electrodes arranged in parallel with the first line, the polarity of the power voltage being reversed alternately according as columns of the first electrodes change, and the light-leakage preventing unit covers the first light leakage region and the non-effective display region in parallel with the first line in a band shape.

7. The apparatus of claim 6, wherein the light-leakage preventing unit comprises at least one metal thin layer that masks light.

8. The apparatus of claim 6, wherein the second light leakage region and the non-effective display region in parallel with the second line is screened by overlapping two color filters selected from the red, green and blue color filters formed on the color filter substrate.

9. The apparatus of claim 8, wherein each of the red, green and blue color filters has the band shape in order to simultaneously screen the second light leakage region, the non-effective display region in parallel with the second line and the respective first electrodes disposed in a column direction.

10. The apparatus of claim 5, wherein the non-effective display region in parallel with the second line is screened by overlapping two color filters selected from the red, green and blue color filters formed on the color filter substrate.

11. The apparatus of claim 10, wherein each of the red, green and blue color filters has the band shape in order to simultaneously screen the respective first electrodes disposed in a row direction.

12. The apparatus of claim 5, wherein the power supply line supplies the power voltage to the first electrodes arranged in parallel with the second line, polarity of the power voltage being reversed alternately according as rows of the first electrodes change, and the light-leakage preventing unit covers the second light leakage region and the non-effective display region parallel with the second line in a band shape.

13. The apparatus of claim 12, wherein the light-leakage preventing unit comprises at least one metal thin layer that masks the light.

14. The apparatus of claim 5, wherein the non-effective display region parallel with the first line is covered by overlapping two color filters selected from the red, green and blue color filters formed on the color filter substrate.

15. The apparatus of claim 14, wherein each of the red, green and blue color filters has the band shape in order to simultaneously screen the respective first electrodes disposed in a column direction.

16. The apparatus of claim 5, wherein the power supply line supplies the power voltage to the first electrodes, the polarity of the power voltage being reversed alternately by changing respective rows and columns of the first electrodes, and the light-leakage preventing unit covers the first light leakage region, the second light leakage region and the non-effective display region in a lattice shape.

17. The apparatus of claim 16, wherein the light-leakage preventing unit comprises at least one metal thin layer that masks the light.

18. The apparatus of claim 17, wherein the metal thin layer is a chromium thin layer.

19. The apparatus of claim 1, wherein remaining sides of each of the first electrodes corresponds to an interface between the color filter and the light-leakage preventing unit.

20. A liquid crystal display apparatus comprising:
a liquid crystal display panel including
a TFT substrate having pixels in which first electrodes are formed, and a first alignment layer on which at least one first alignment groove is aligned in a first rubbing direction,
a color filter substrate having second electrodes opposite to the first electrodes, a second alignment layer on which a second alignment groove is aligned in a second nabbing direction, and color filters,
a liquid crystal interposed between the TFT substrate and the color filter substrate, and
a light-leakage preventing unit that screens a non-effective display region disposed between the pixels and an edge portion of one of the pixels, the light-leakage preventing unit including a first side disposed on one of the first electrodes and a second side disposed at a side of the non-effective display region; and
a backlight assembly that provides a light to the liquid crystal display panel
wherein the light leakage preventing unit is displaced over only two adjacent sides of each of the first electrodes.

21. The apparatus of claim 20, wherein a portion of the light leakage preventing unit is disposed on one edge portion of each of the first electrodes.

22. The apparatus of claim 20, wherein remaining sides of each of the first electrodes corresponds to an interface between the color filter and the light-leakage preventing unit.

23. A liquid crystal display apparatus comprising:
a liquid crystal display panel including
a TFT substrate having pixels in which first electrodes are formed, and a first alignment layer on which at least one first alignment groove is aligned in a first rubbing direction,
a color filter substrate having second electrodes opposite to the first electrodes, a second alignment layer on which a second alignment groove is aligned in a second rubbing direction, and color filters,
a liquid crystal interposed between the TFT substrate and the color filter substrate, and
a light-leakage preventing unit that masks a non-effective display region being displaced between the pixels and an edge portion of the first electrode, the edge portion disposed adjacent to a side of the first electrode where only the first rubbing is started; and
a backlight assembly that provides light to the liquid crystal display panel.

24. The apparatus of claim 23, wherein a portion of the light leakage preventing unit is disposed on one edge portion of each of the first electrodes.

25. The apparatus of claim 23, wherein portions of the light leakage preventing unit are disposed on only two adjacent edge portions of each of the first electrodes, respectively.

26. The apparatus of claim 25, wherein remaining sides of each of the first electrodes corresponds to an interface between the color filter and the light-leakage preventing unit.

* * * * *